3,443,879
PREPARATION OF A WEATHER RESISTANT COTTON PRODUCT BY A MOLECULAR PROTECTION PROCESS
Jett C. Arthur, Jr., and Trinidad Mares, Metairie, La., assignors to the United States of America as represented by the Secretary of Agriculture
No Drawing. Filed Apr. 11, 1966, Ser. No. 541,509
Int. Cl. D06m *13/20;* C08b *3/10*
U.S. Cl. 8—120          2 Claims A non-exclusive, irrevocable, royalty-free license in the invention herein described, throughout the world for all purposes of the United States Government, with the power to grant sublicenses for such purposes, is hereby granted to the Government of the United States of America.

This invention relates to the formation of cotton cellulose derivatives through benzoylation. More specifically, this invention relates to the formation of cotton derivatives wherein the benzoylation reaction is carried out by a process which affects intramolecular and intermolecular energy transfers to minimize deterioration of cotton products submitted to weathering. This molecular protection process makes possible the preparation of cotton products with improved breaking strength retention when these cotton products are used out-of-doors.

One object of this invention is to provide a cellulosic derivative which can withstand weathering and exposure to ionizing radiation.

Another object of this invention is to provide a process for the preparation of a suitable benzoylated cotton cellulose wherein the final product is a fibrous, highly substituted product with good breaking strength, and with the ability to retain that strength when submitted to out-of-doors utilization.

A further object of this invention is to provide a method for the modification of the molecular properties of fibrous cellulose in a manner which affects intermolecular and intramolecular energy transfers to minimize deterioration of the cellulose molecule, in particular the retention of the breaking strength of the fibers on exposure to weathering.

One of the most important uses of cotton has been in the production of textiles destined for out-of-doors use in one form or another. Cotton normally suffers breaking strength losses when exposed to weathering or to radiation. Because of this a considerable amount of time and effort has been and is still being employed by industry and government in investigation of chemical treatments to impart weathering resistance to cotton products. To date most of the formulations applied to cotton have yielded no wholly satisfactory process for accomplishing the desired results.

One of the principal degradation factors in cotton weathering is the absorption of energy from incident light. Intermolecular and intramolecular transfers of energy occur within the cellulose molecule which results in the localization of energy at covalent chemical bonds. This results in chemical and in turn physical changes through oxidation of the cellulose molecule, activation of excited sites, evolution of gases—including hydrogen, carbon dioxide, and carbon monoxide—and/or degradation of the molecule, particularly through depolymerization. The most obvious of the physical changes that accompany the chemical changes is the loss of breaking strength.

The prior art includes technological processes depending primarily on addition of coatings or screeners on the surface of the fibers to prevent the absorption of energy from incident light, thereby minimizing chemical changes. By these efforts the prior art has not been very successful in that absorption of incident light has not been eliminated. Leaching, also, has been a factor in failures of padded chemical formulations.

By process of our present invention we have unexpectedly discovered that the cellulose molecule of cotton can be protected from weathering degradation by preventing the localization of absorbed energy in a covalent chemical bond through direction of said energy in intermolecular and intramolecular transfer of the said energy. Absorbed energy can be localized within a cellulose molecule in transitions between electronic levels from the cellulose molecule to a chemical group containing $\alpha$-electrons from which the energy may be harmlessly dissipated as heat or light energy. This minimized the localization of absorbed energy in covalent chemical bonds of the cellulose molecule and the resulting losses in breaking strength of the weathered cotton. To the consumer of cotton products this means extension of the service life of a cotton article which is used out-of-doors. This extension of the service life is possible by the utilization of our present invention.

Our present invention can be described as both a process and a product. The product contains the properties thus far described, and the process which imparts to cotton and other cellulosic materials the resistance to weathering and high energy radiation degradation comprises:

(a) Reacting the cellulosic material slack with benzoyl chloride in pyridine, about 20% by weight, for about from 8 to 25 minutes of time, at temperatures about from 65° to 110° C., to obtain a fibrous, chemically modified cellulosic derivative containing about from 0.6 to 1.5 benzoyl groups for each anhydroglucose unit of the cellulosic material, (b) Washing the reacted material in an excessive quantity of pyridine to stop the reaction, (c) Stretching the freshly reacted and pyridine-washed material at ambient temperatures to about from 80% to 90% of the material's original dimensions, and (d) Washing the reacted material while the material remains at the desired stretch tension with pyridine, with methanol, and finally with water.

In the preparation of a benzoylated cotton yarn which would be satisfactory in our investigative work we prefer to react, for example, a cotton yarn, about 8 minutes at about 90° C. to obtain a preferred derivative with a degree of substitution of about 0.6 benzoyl groups per anhydroglucose unit of the cellulosic yarn. The reacted and pyridine washed material would then be stretched to about 80% of its original length, then while still under this tension, washed with more pyridine to remove the reagents, then with methanol, and finally with water. The temperature of the wash solvents would be about 25° C. in each case.

In striving for a D.S. of about 1.1 another cotton yarn skein (7/3s) was reacted 10 minutes at 90° C., the reaction stopped with excess pyridine, the yarn stretched to 80% of its original length, washed as before and allowed to dry. One portion of this yarn was subjected to weathering for a period of 10 weeks, then the weathered yarn together with the portion set aside were submitted to breaking strength tests. The unweathered portion was found to have 11.1 pounds at the breaking point, while the weathered portion had 11.2 pounds. This is what we consider to be indicative of 100% molecular protection to weather degradation. To evaluate this yarn against untreated yarn another skein of the same yarn was weathered side-by-side with the benzoylated sample for the same 10 weeks. This sample was tested with the others and with an untreated, unweathered portion. The breaking strength of the untreated, weathered and unweathered yarns were 5.8 and 11.7 pounds, respectively, which indicates a 50% breaking strength loss. Other samples of benzoylated cotton materials, treated by process of our invention to varying degrees of substitution provided equally satisfactory, and selected samples are reported in the tables.

In the investigation work which led to our discovery, with these and with other carbohydrate compounds, we were able to support our contention that the molecular effect of our process was providing the protective barrier, resulting in the intermolecular and intramolecular transfer of absorbed energy through the ester linkage to the aromatic group from which the energy was harmlessly dissipated as light, avoiding the degradation of the carbohydrate molecule. We have unexpectedly discovered that when the aromatic group is linked to the carbohydrate molecule through other type linkages the transfer and dissipation of absorbed energy occur to a much lesser degree, resulting in the degradation of the model carbohydrate compound.

To evaluate some of our investigative work and products the data obtained in the treatment of cotton yarns of high, medium, and low levels of substitution were tabulated, and submitted as proof of the efficacy of our invention in Tables IA and IB. Specifically the tables show the difference in breaking strength retention when the degree of substitution is varied, with reference to weathering; and the breaking strength differences when tension is varied in the treatment, again with reference to weathering. Table II presents the selected data obtained with yarns submitted to ionizing radiation.

TABLE I.—WEATHER RESISTANCE OF BENZOYLATED COTTON YARNS [1]

A. Yarns stretched before drying

| Weathering, weeks | Breaking strength of yarns, lbs. | | | |
|---|---|---|---|---|
| | Cotton control | Degree of substitution | | |
| | | 0.6 | 1.1 | 1.5 |
| 0 | 11.7 | 11.0 | 11.1 | 8.7 |
| 10 | 5.8 | 9.4 | 11.2 | 7.6 |
| 26 | 3.1 | 8.6 | 9.9 | 9.6 |

B. Yarns dried slack

| Weathering, weeks | Breaking strength of yarns, lbs. | |
|---|---|---|
| | Cotton control | D.S. 1.5 |
| 0 | 11.7 | 3.9 |
| 13 | 2.6 | 3.2 |
| 26 | 1.5 | 3.6 |

[1] Instron properties.

TABLE II.—RADIATION RESISTANCE OF BENZOYLATED COTTON YARNS [1,2]

| Degree of substitution | Unirradiated | | Irradiated | |
|---|---|---|---|---|
| | Breaking strength, lbs. | Elongation at break, percent | Breaking strength, lbs. | Elongation at break, percent |
| Purified cotton yarn | | | | |
| 0.0 | 10.5 | 15.9 | 2.7 | 9.6 |
| Restretched treated yarn | | | | |
| 0.8 | 9.8 | 15.0 | 8.0 | 13.0 |
| 1.0 | 12.6 | 11.2 | 7.9 | 7.9 |
| 1.3 | 12.8 | 12.4 | 10.3 | 11.4 |
| Slack treated yarn | | | | |
| 1.3 | 5.2 | 23.7 | 4.2 | 21.9 |
| 1.5 | 6.5 | 34.2 | 5.5 | 39.7 |

[1] Instron properties.
[2] Cobalt-60 gamma radiation dosage: 25 megarads.

The following examples are presented to further illustrate this invention in detail, and are not meant to limit the scope of its applicability.

Example 1

Cotton yarn (12 parts) was dried in air for 30 minutes at 110° C. and then immersed in about 12 times its weight of pyridine preheated to 90° C. and held in a constant temperature bath. Benzoyl chloride (30 parts), also preheated to 90° C., was added to the mixture. The yarns were reacted slack. After about 8 minutes, the reaction was stopped by transferring the benzoylated cotton yarns to pyridine (about 30 times the weight of yarn) at 25° C. The yarns were stretched to about 80 percent of their original length and while still under tension washed with pyridine, followed by methanol, then thoroughly rinsed with water, and air-dried. On analysis it was determined that the degree of substitution of the cotton yarn was 0.6 benzoyl groups per anhydroglucose unit and the breaking strength of the yarn was 11.0 pounds. On exposure of the benzoylated cotton yarn and a purified control cotton yarn to weathering the following results were obtained, respectively: initial breaking strength, 11.0 pounds and 11.7 pounds; 10 weeks of weathering, 9.4 pounds and 5.8 pounds; 26 weeks of weathering 8.6 pounds and 3.1 pounds. It was concluded that benzoylation to 0.6 D.S. protected the cotton from weathering degradation.

Example 2

Benzoylated cotton yarn was prepared in accordance with procedure outlined in Example 1, except the reaction was allowed to proceed for 10 minutes. On analysis it was determined that the degree of substitution of the cotton yarn was 1.1 benzoyl groups per anhydroglucose unit and the breaking strength of the yarn was 11.1 pounds. On exposure of the benzoylated cotton yarn and a purified control cotton yarn to weathering the following results were obtained, respectively: initial breaking strength, 11.1 pounds and 11.7 pounds; 10 weeks of weathering, 11.2 pounds and 5.8 pounds; 26 weeks of weathering 9.9 pounds and 3.1 pounds. It was concluded that benzoylation to 1.1 D.S. protected the cotton from weathering degradation.

Example 3

Benzoylated cotton yarn was prepared in accordance with procedure outlined in Example 1, except the reaction was allowed to proceed for 15 minutes. On analysis it was determined that the degree of substitution of the cotton yarn was 1.5 benzoyl groups per anhydroglucose unit and the breaking strength of the yarn was 8.7 pounds. On exposure of the benzoylated cotton yarn and a purified control cotton yarn to weathering the following results were obtained, respectively: initial breaking strength, 8.7 pounds and 11.7 pounds; 10 weeks of weathering, 7.6 pounds and 5.8 pounds; 26 weeks of weathering 9.6 pounds and 3.1 pounds. It was concluded that benzoylation to 1.5 D.S. protected the cotton from weathering degradation.

Example 4

Benzoylated cotton yarn was prepared in accordance with procedure outlined in Example 1, except that the reaction was at 80° C. for 25 minutes and the benzoylated yarn was dried in a slack condition. On analysis it was determined that the degree of substitution of the cotton yarn was 1.5 benzoyl groups per anhydroglucose unit and the breaking strength of the yarn was 3.9 pounds. On exposure of the benzoylated cotton yarn and a purified control cotton yarn to weathering the following results were obtained, respectively: initial breaking strength, 3.9 pounds and 11.7 pounds; 13 weeks of weathering, 3.2 pounds and 2.6 pounds; 26 weeks of weathering 3.6 pounds and 1.5 pounds. It was concluded that benzoylation to 1.5 D.S. protected the cotton from weathering degradation.

We claim:
1. A process for imparting to cellulosic materials resistance to weathering and high energy radiation degradation comprising:
  (a) reacting the cellulosic material slack with benzoyl chloride in pyridine, about 20% by weight, for from 8 to 25 minutes of time, at temperatures about from 65° to 110° C., to obtain a fibrous, chemically modified cellulosic derivative containing about from

0.6 to 1.5 benzoyl groups for each anhydroglucose unit of the cellulosic material,
(b) washing the reacted material in an excessive quantity of pyridine to stop the reaction,
(c) stretching the freshly reacted and pyridine-washed material at ambient temperatures to about from 80% to 90% of the material's original dimensions, and
(d) washing the reacted material while the material remains at the desired stretch tension with pyridine, with methanol, and finally with water.
2. The product obtained by the process of claim 1.

References Cited

"The Preparation and Properties of Partially Benzylated Cotton," Textile Research Journal, vol. XXVIII, No. 8, August 1958.

MAYER WEINBLATT, *Primary Examiner.*

U.S. Cl. X.R.

260—214; 8—116